US009817733B2

(12) United States Patent
Mulcahy et al.

(10) Patent No.: US 9,817,733 B2
(45) Date of Patent: *Nov. 14, 2017

(54) RESOURCE RECOVERY FOR CHECKPOINT-BASED HIGH-AVAILABILITY IN A VIRTUALIZED ENVIRONMENT

(75) Inventors: James Mulcahy, Manchester (GB); Geraint North, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 568 days.

This patent is subject to a terminal disclaimer.

(21) Appl. No.: 13/253,519

(22) Filed: Oct. 5, 2011

(65) Prior Publication Data

US 2013/0091335 A1    Apr. 11, 2013

(51) Int. Cl.
G06F 17/30     (2006.01)
G06F 12/08     (2016.01)
G06F 12/0808   (2016.01)
G06F 12/0815   (2016.01)
(Continued)

(52) U.S. Cl.
CPC ...... *G06F 11/2025* (2013.01); *G06F 11/2038* (2013.01); *G06F 11/2048* (2013.01); *G06F 11/2097* (2013.01); *G06F 12/145* (2013.01); *G06F 11/2023* (2013.01); *G06F 2201/815* (2013.01)

(58) Field of Classification Search
None
See application file for complete search history.

(56) References Cited

U.S. PATENT DOCUMENTS 5,574,878 A    11/1996  Onodera et al.
6,766,413 B2   7/2004   Newman
(Continued)

FOREIGN PATENT DOCUMENTS

WO    2009132464 A1    11/2005

OTHER PUBLICATIONS

Cully et al. :Remus: High availability via Asynchronous Virtual Machine Replication; pp. 162-174; Aug. 2008.*
(Continued)

*Primary Examiner* — Daniel C Chappell
*Assistant Examiner* — Mohamed Gebril
(74) *Attorney, Agent, or Firm* — Yudell Isidore PLLC (57) ABSTRACT

A data processing system provides checkpoint high-available for an application in a virtualized environment with reduced network demands. An application executes on a primary host machine comprising a first virtual machine. A virtualization module receives a designation from the application of a portion of the memory of the first virtual machine as purgeable memory, where the purgeable memory can be reconstructed by the application when the purgeable memory is unavailable. Changes are tracked to a processor state and to a remaining portion that is not purgeable memory and the changes are periodically forwarded at checkpoints to a secondary host machine. In response to an occurrence of a failure condition on the first virtual machine, the secondary host machine is signaled to continue execution of the application by using the forwarded changes to the remaining portion of the memory and by reconstructing the purgeable memory.

20 Claims, 7 Drawing Sheets

(51) Int. Cl.
*G06F 11/20* (2006.01)
*G06F 12/14* (2006.01)

(56) References Cited

U.S. PATENT DOCUMENTS

| | | | | |
|---|---|---|---|---|
| 6,782,410 | B1* | 8/2004 | Bhagat | G06F 9/5027 709/201 |
| 6,842,377 | B2* | 1/2005 | Takano | G11C 7/1021 365/185.21 |
| 7,017,011 | B2* | 3/2006 | Lesmanne | G06F 12/082 711/141 |
| 7,196,942 | B2* | 3/2007 | Khurana | G11C 7/1051 326/38 |
| 7,269,715 | B2* | 9/2007 | Le | G06F 9/3802 712/215 |
| 7,321,955 | B2* | 1/2008 | Ohmura | G06F 12/0804 711/113 |
| 7,409,487 | B1 | 8/2008 | Chen et al. | |
| 7,512,736 | B1* | 3/2009 | Overby | G06F 3/0607 707/999.202 |
| 8,230,193 | B2* | 7/2012 | Klemm | G06F 3/0608 711/114 |
| 8,443,166 | B2* | 5/2013 | Czezatke | G06F 11/1451 711/203 |
| 8,566,546 | B1* | 10/2013 | Marshak | G06F 3/0604 711/112 |
| 8,984,031 | B1* | 3/2015 | Todd | G06F 17/30091 707/823 |
| 8,990,527 | B1* | 3/2015 | Linstead | G06F 3/0617 711/161 |
| 2004/0068621 | A1* | 4/2004 | Van Doren | G06F 12/0828 711/144 |
| 2005/0125607 | A1* | 6/2005 | Chefalas | G06F 12/0862 711/113 |
| 2006/0206658 | A1 | 9/2006 | Hendel et al. | |
| 2007/0008328 | A1* | 1/2007 | MacWilliams | G06F 12/0646 345/530 |
| 2008/0155553 | A1 | 6/2008 | Astigarraga et al. | |
| 2009/0037682 | A1* | 2/2009 | Armstrong | G06F 12/1475 711/164 |
| 2009/0094413 | A1* | 4/2009 | Lehr | G06F 3/0605 711/112 |
| 2009/0228648 | A1* | 9/2009 | Wack | G06F 11/1092 711/114 |
| 2009/0271472 | A1* | 10/2009 | Scheifler | G06F 9/485 709/202 |
| 2009/0282101 | A1* | 11/2009 | Lim | G06F 9/5077 709/203 |
| 2010/0046267 | A1* | 2/2010 | Yan | G11C 16/24 365/51 |
| 2010/0050016 | A1* | 2/2010 | Franklin | G06F 11/0727 714/6.32 |
| 2010/0106926 | A1* | 4/2010 | Kandasamy | G06F 12/1458 711/163 |
| 2010/0122052 | A1 | 5/2010 | Waldspurger et al. | |
| 2010/0125712 | A1* | 5/2010 | Murase | G06F 11/1458 711/162 |
| 2010/0169537 | A1 | 7/2010 | Nelson | |
| 2010/0332479 | A1* | 12/2010 | Prahlad | G06F 17/302 707/741 |
| 2010/0332780 | A1* | 12/2010 | Furuya | G06F 3/0689 711/162 |
| 2011/0066668 | A1* | 3/2011 | Guarraci | G06F 17/30233 707/831 |
| 2011/0154103 | A1* | 6/2011 | Bulusu | G06F 11/1658 714/6.23 |
| 2011/0202735 | A1* | 8/2011 | Kono | G06F 11/1451 711/162 |
| 2011/0307745 | A1* | 12/2011 | McCune | G06F 17/30221 714/54 |
| 2012/0131232 | A1* | 5/2012 | Brownlow | G06F 13/4221 710/10 |
| 2012/0198107 | A1* | 8/2012 | McKean | G06F 13/18 710/40 |
| 2013/0007373 | A1* | 1/2013 | Beckmann | G06F 12/126 711/136 |
| 2013/0055253 | A1* | 2/2013 | Jubran | G06F 9/455 718/1 |
| 2013/0067161 | A1* | 3/2013 | Chandra | G06F 13/12 711/114 |
| 2013/0080805 | A1* | 3/2013 | Vick | G06F 8/4432 713/320 |
| 2013/0086268 | A1* | 4/2013 | Sloma | G06F 9/455 709/226 |
| 2013/0111129 | A1* | 5/2013 | Maki | G06F 3/0611 711/117 |
| 2013/0152097 | A1* | 6/2013 | Boctor | G06F 9/505 718/103 |
| 2013/0326270 | A1* | 12/2013 | Chen | G06F 11/2089 714/6.21 |
| 2014/0003114 | A1* | 1/2014 | Pellizzer | H01L 27/2481 365/63 |

OTHER PUBLICATIONS

Bricknell, K.J., Carbon Programming, Oct. 18, 2001, pp. 1599, Sams Publishing, US.

Apple, Inc., Memory Management Programming Guide, Mar. 24, 2011, Cupertino, CA.

* cited by examiner

RESOURCE RECOVERY FOR CHECKPOINT-BASED HIGH-AVAILABILITY IN A VIRTUALIZED ENVIRONMENT

BACKGROUND

1. Technical Field

The present disclosure relates to a virtualized environment for a data processing system, and more particularly to resource recovery on a secondary host machine in the event of a failure condition of a virtual machine operating on a primary host machine.

2. Description of the Related Art

Checkpoint-based high-availability is a technique whereby a virtual machine running on a host machine (the "Primary host") regularly (e.g., every 25 ms) mirrors its Central Processing Unit (CPU) and memory state onto another host machine (the "Secondary Host"). This mirroring process involves: 1. tracking changes to the memory and processor state of the virtual machine; 2. periodically stopping the virtual machine; 3. sending these changes over a network to the secondary host; 4. waiting for the secondary host to acknowledge receipt of the memory and CPU state update; and 5. resuming the virtual machine.

The mirroring process ensures that the secondary host is able to resume the workload with no loss of service should the primary host suffer a sudden hardware failure. If the secondary host either notices that the primary host is not responding, or receives an explicit notification from the primary host, the secondary host starts the mirrored version of the virtual machine. The effect to the outside world is that the virtual machine has seamlessly continued to execute across the failure of the primary host.

One of the key performance bottlenecks in this process is the rate at which pages of modified memory must be transferred from the primary host to the secondary host during execution. In all implementations of this technology today, modifications to memory can only be detected with page-level granularity, which is at least 4 Kbits. The hypervisor achieves this by marking all memory used by the virtual server as read-only following every checkpoint, and detecting the faults that occur when the virtual server attempts to write to a page of memory. The hypervisor can then record that the page has been modified and must therefore be transferred at the next checkpoint. Then the hypervisor can remove the write-protection so that future writes to that page do not cause a fault. At the next checkpoint, the memory is re-protected and the list of modified pages cleared.

The cost of this approach is therefore at least twofold. First, the first write to any page in a given checkpoint interval (the space between two checkpoints) causes a fault that must be handled before the workload can resume. Second, the page must be transferred to the secondary host, which consumes network bandwidth.

BRIEF SUMMARY

Disclosed are a computer program product and a data processing system that supports high availability of an application executed in a host virtual machine by forwarding at checkpoints changes in the host virtual machine to a secondary virtual machine. An amount of data required to be forwarded for failing over to the secondary virtual machine is reduced by not forwarding portions of memory of the first virtual machine that are deemed to be "not essential" (or purgeable) by the application. In particular, the application deems the portions of memory which the application can reconstruct as not essential and/or purgeable.

In another aspect, the present disclosure provides a computer program product for resource recovery comprising a computer readable storage medium. Program code on the computer readable storage medium can be executed by a processor executing an application on a primary host machine comprising a first virtual machine with the processor and a memory. The program code performs a series of functions, as follows: A designation is received from the application of a portion of the memory of the first virtual machine as purgeable memory, wherein the purgeable memory can be reconstructed by the application when the purgeable memory is unavailable. Changes are tracked to a processor state and to a remaining portion of the memory assigned to the application that is not designated by the application as purgeable memory. The first virtual machine is periodically stopped. In response to stopping the first virtual machine, the changes to the remaining portion of the memory are forwarded to a secondary host machine comprising a second virtual machine. In response to completing the forwarding of the changes, execution of the first virtual machine is resumed. In response to an occurrence of a failure condition on the first virtual machine, the secondary host machine is signaled to continue execution of the application by using the forwarded changes to the remaining (essential) portion of the memory and by having the application reconstruct the purgeable memory.

In a further aspect, the present disclosure provides a data processing system having a processor that executes an application on a primary host machine comprising a first virtual machine with the processor and a memory. A virtualization module receives a designation from the application of a portion of the memory of the first virtual machine as purgeable memory, wherein the purgeable memory can be reconstructed by the application when the purgeable memory is unavailable. The virtualization module tracks changes to a processor state and to a remaining portion of the memory assigned to the application that is not designated by the application as purgeable memory. The virtualization module periodically stops the first virtual machine. The virtualization module, in response to stopping the first virtual machine, forwards the changes to the remaining portion of the memory to a secondary host machine comprising a second virtual machine. The virtualization module, in response to completing the forwarding of the changes, resumes execution of the first virtual machine. The virtualization module, in response to an occurrence of a failure condition on the first virtual machine, signals the secondary host machine to continue execution of the application by using the forwarded changes of the remaining (essential) portion of the memory and by causing the application to reconstruct the purgeable memory.

The above as well as additional objectives, features, and advantages of the present innovation will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The embodiments presented herein provide a method, a computer program product, and a data processing system that supports high availability of an application executed in a host virtual machine by forwarding at checkpoints changes to processor states and memory in the host virtual machine to a secondary virtual machine. The application deems the portions of memory which the application can reconstruct as not essential and/or purgeable. The amount of memory data required to be forwarded during the checkpoints to enable failing over to the secondary virtual machine is reduced by forwarding only portions of memory that are deemed essential by the application. The portions of memory of the first virtual machine that are deemed to be "not essential" (or purgeable) by the application are not forwarded and are reconstructed at the secondary virtual machine following a failover.

In the following detailed description of exemplary embodiments of the innovation, specific exemplary embodiments in which the innovation may be practiced are described in sufficient detail to enable those skilled in the art to practice the innovation, and it is to be understood that other embodiments may be utilized and that logical, architectural, programmatic, mechanical, electrical and other changes may be made without departing from the spirit or scope of the present innovation. The following detailed description is, therefore, not to be taken in a limiting sense, and the scope of the present innovation is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the described embodiments. The presented embodiments may thus be implemented with different nomenclature/terminology utilized to describe the components/devices/parameters herein, without limitation. Each term utilized herein is to be given its broadest interpretation given the context in which that terms is utilized.

As further described below, implementation of the functional features of the innovation is provided within processing devices/structures and involves use of a combination of hardware, firmware, as well as several software-level constructs (e.g., program code). The presented figures illustrate both hardware components and software components within example data processing.

Aspects of the illustrative embodiments provide a computer-implemented method, data processing system and computer program product by which a programmable application program interface (API) provides protection for portions of memory for an application executing on a primary virtual machine and implements a recovery mechanism when the memory is inaccessible following a failover to a secondary virtual machine. Further, the present innovation extends to both the operating system (OS) and the application a mechanism for enabling notification of reconstructable memory in a checkpoint based high availability system.

According to one or more embodiments, an API enables an application to mark regions of the application's memory as purgeable. This mark is used to indicate regions of memory which, if unavailable, the application would be able to recover. Examples of such regions of memory include, but are not limited to caches and other disposable components that the application can reconstruct. The information/mark that identifies purgeable memory is propagated to an underlying operating system or hypervisor to prevent transmission to the secondary host machine during a checkpointing operation on the primary host machine, thereby reducing a transmission burden across/on the network.

If a virtual machine, such as a virtual server, fails over to the secondary host machine due to hardware failure on the primary host machine, this purgeable memory, such as purgeable pages, are not be mapped in by the hypervisor and thus accesses to the purgeable pages by the application on the secondary host machine will cause a fault. The application responds to this fault by re-mapping memory and recreating any of the required caches on the secondary host machine.

It is appreciated that the computing environment in which the described embodiments can be practice can be a cloud computing environment. Cloud computing refers to Internet-based computing where shared resources, software, and information are provided to users of computer systems and other electronic devices (e.g., mobile phones) on demand, similar to the electricity grid. Adoption of cloud computing has been aided by the widespread utilization of virtualization, which is the creation of a virtual (rather than actual) version of something, e.g., an operating system, a server, a storage device, network resources, etc. A virtual machine (VM) is a software implementation of a physical machine (e.g., a computer system) that executes instructions like a physical machine. VMs are usually categorized as system VMs or process VMs. A system VM provides a complete system platform that supports the execution of a complete operating system (OS). In contrast, a process VM is usually designed to run a single program and support a single process. A VM characteristic is that application software running on the VM is limited to the resources and abstractions provided by the VM. System VMs (also referred to as hardware VMs) allow the sharing of the underlying physical machine resources between different VMs, each of which executes its own OS. The software that provides the virtualization and controls the VMs is typically referred to as a VM monitor (VMM) or hypervisor. A hypervisor may run on bare hardware (Type 1 or native VMM) or on top of an operating system (Type 2 or hosted VMM).

Cloud computing provides a consumption and delivery model for information technology (IT) services based on the Internet and involves over-the-Internet provisioning of dynamically scalable and usually virtualized resources. Cloud computing is facilitated by ease-of-access to remote computing websites (e.g., via the Internet or a private corporate network) and frequently takes the form of web-based tools or applications that a cloud consumer can access and use through a web browser, as if the tools or applications were a local program installed on a computer system of the cloud consumer. Commercial cloud implementations are generally expected to meet quality of service (QoS) requirements of consumers and typically include service level agreements (SLAs). Cloud consumers avoid capital expenditures by renting usage from a cloud vendor (i.e., a third-party provider). In a typical cloud implementation, cloud consumers consume resources as a service and pay only for resources used.

Figure 1:
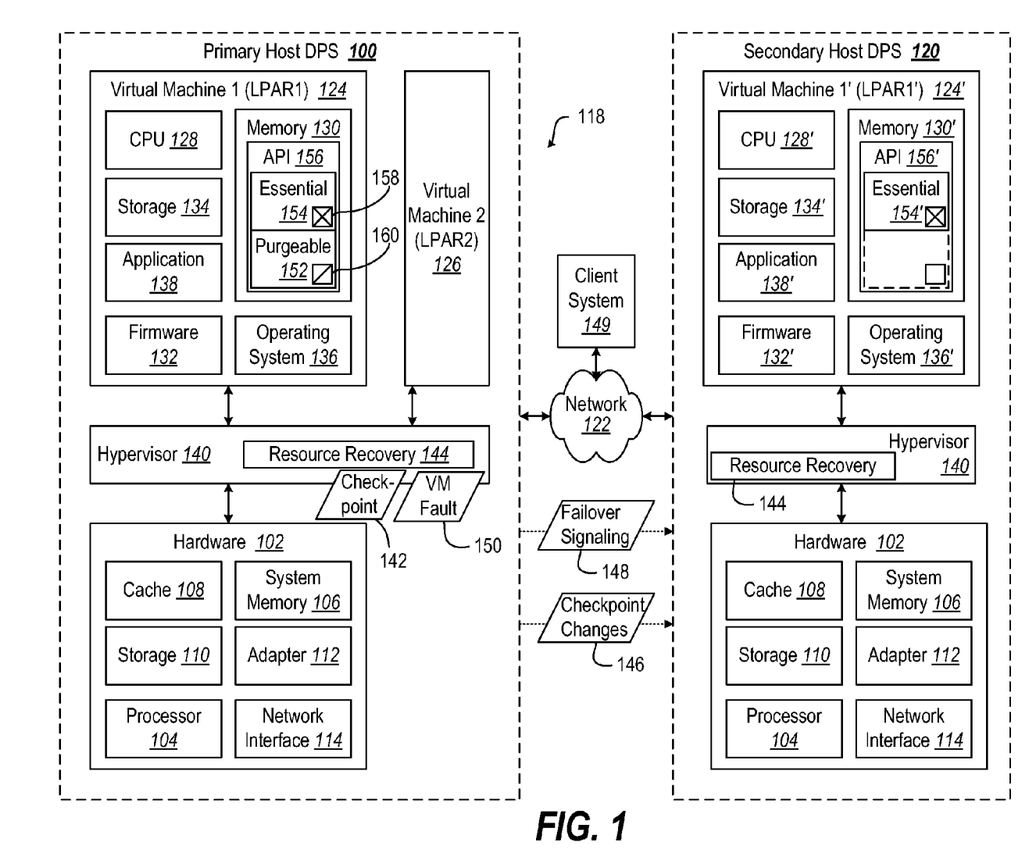
FIG. 1 provides a block diagram representing a mirrored virtualized data processing system (DPS) environment that supports resource recovery, according to one or more embodiments.

With reference now to the figures, and beginning with FIG. 1, there is depicted a block diagram representation of an example mirrored virtualized data processing system (DPS) environment/architecture, as utilized within one embodiment. The data processing system is described as having features common to a server computer. However, as used herein, the term "data processing system," is intended to include any type of computing device or machine that is capable of receiving, storing and running a software product, including not only computer systems, but also devices such as communication devices (e.g., routers, switches, pagers, telephones, electronic books, electronic magazines and newspapers, etc.) and personal and home consumer devices (e.g., handheld computers, Web-enabled televisions, home automation systems, multimedia viewing systems, etc.).

FIG. 1 and the following discussion are intended to provide a brief, general description of an exemplary data processing system architecture adapted to implement the described embodiments. While embodiments will be described in the general context of instructions residing on hardware within a server computer, those skilled in the art will recognize that embodiments may be implemented in a combination of program modules running in an operating system. Generally, program modules include routines, programs, components, and data structures, which perform particular tasks or implement particular abstract data types. The invention may also be practiced in distributed computing environments where tasks are performed by remote processing devices that are linked through a communications network. In a distributed computing environment, program modules may be located in both local and remote memory storage devices.

A primary host machine such as DPS 100 can include hardware 102 including one or more processing units ("processor") 104, a system memory 106, cache memory 108 for high speed storage of frequently used data, storage 110 such as hard drives, an input output adapter 112 and a network interface 114. Cache memory 108 can be connected to or communicatively coupled with processor 104 or can operatively be a part of system memory 106.

Primary host DPS 100 further includes computer readable storage media ("storage") 110, such as one or more hard disk drives and one or more user interface devices. For instance, disk drives and user interface devices can be communicatively coupled to system interconnect fabric by an input-output (I/O) adapter 112. Disk drives provide nonvolatile storage for primary host DPS machine 100. User interface devices allow a user to provide input and receive output from primary host machine DPS 100. For example, user interface devices can include displays, keyboards and pointing devices such as a mouse. Although the description of computer readable storage media above refers to a hard disk, it should be appreciated by those skilled in the art that other types of media which are readable by a computer, such as removable magnetic disks, CD-ROM disks, magnetic cassettes, flash memory cards, digital video disks, Bernoulli cartridges, and other later-developed hardware, may also be used in the exemplary computer operating environment.

Primary host machine DPS 100 may operate in a networked environment 118 using logical connections to one or more remote computers or hosts, such as secondary host machine 120. Secondary host machine 120 may be a computer, a server, a router or a peer device and typically includes many or all of the elements described relative to primary host machine DPS 100. In a networked environment, program modules employed by primary host machine DPS 100, or portions thereof, may be stored in a remote memory storage device. The logical connections depicted in FIG. 1 include connections over a network 122. In an embodiment, network 122 may be a local area network (LAN). In alternative embodiments, network 122 may include a wide area network (WAN). Primary host machine DPS 100 is connected to network 122 through an input/output interface, such as the network interface 114. It will be appreciated that the network connections shown are exemplary and other means of establishing a communications link between the computers may be used.

Those of ordinary skill in the art will appreciate that the hardware components and basic configuration depicted in FIG. 1 may vary. The illustrative components within primary host machine DPS 100 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

FIG. 1 illustrates multiple virtual machines operating on the primary and secondary host machine data processing systems 100 in a logically partitioned system according to an embodiment. Primary host machine DPS 100 includes several virtual machines (VM) or logical partitions (LPAR) such as VM 1 (LPAR1) 124 and VM 2 (LPAR2) 126. While two virtual machines or logical partitions are illustrated, many additional virtual machines or logical partitions can be used in DPS 100. Each of logical partitions VM 1 (LPAR1) 124 and VM 2 (LPAR2) 126 is a division of resources of primary host machine DPS 100.

Each LPAR such as VM 1 (LPAR1) 124 comprises a virtual processor ("Central Processing Unit (CPU)") 128, virtual memory 130, virtual firmware 132 and virtual storage 134. VM 1 (LPAR1) 124 further includes functional modules or software modules such as virtual operating system (OS) 136 and application software ("application") 138. Application 138 is executed at least within logical partition VM 1 (LPAR1) 124. VM 1 (LPAR1) 124 and VM 2

(LPAR2) 126 operate under the control of a hypervisor 140. Each VM (LPAR) 124, 126 can communicate with each other and with hypervisor 140. Hypervisor 140 manages interaction between and allocates resources between VM 1 (LPAR1) 124 and VM 2 (LPAR2) 126 and virtual processors such as virtual processor 128. Hypervisor 140 controls the operation of VMs (LPARs) 124, 126 and allows multiple operating systems 136 to run, unmodified, at the same time on primary host machine DPS 100 and provides a measure of robustness and stability to the system. Each operating system 136, and thus application 138, within the hypervisor 140 operates independently of the others, such that if one VM 1 (LPAR1) 124 experiences a failure, the other VMs, such as VM 2 (LPAR2) 126, can continue working without interruption.

Similarly, secondary host machine DPS 120 can include several virtual machines or logical partitions (LPAR). For clarity, only one VM 1' (LPAR1') 124' is depicted. For clarity, secondary host machine DPS 120 can include identical or similar hardware 102 as primary host machine DPS 100. While one logical partition is illustrated, many additional logical partitions can be used in secondary host machine DPS 120. Each logical partition VM 1' (LPAR1') 124' is a division of resources of secondary host machine DPS 120. The prime annotation is to denote that the logical partition VM 1' (LPAR1') 124' and its constituent components are intended to be essentially identical to the VM 1 (LPAR1) 124 on the primary host machine DPS 100, at least as of a previous checkpoint 142 in time with a notable exception disclosed herein. In particular, the hypervisor 140 of the primary host machine DPS 100 comprises a virtualization module 144 for resource recovery that periodically forwards information regarding the VM 1 (LPAR1) 124 sufficient for the corresponding virtualization module 144 of hypervisor 140 the secondary host machine DPS 120 to create and maintain a version of the VM 1 (LPAR1) 124. Network 122 allows the hypervisors 140 to communicate with each other and to transfer data and operating parameters. For instances changes 146 for VM 1 (LPAR1) 124 at each checkpoint 142 can be transmitted. Thus, the version of the application 138' executing on VM 1' (LPAR1') 124' can seamlessly take over execution of the application 138 for a client system 149 should the secondary host machine DPS 120 detect or receive failover signaling 148 from the primary host machine DPS 100 when a VM fault 150 is detected.

In an exemplary aspect, the virtualization module 144 of the primary host machine DPS 100 performs functions to provide checkpoint-based high availability while mitigating an amount of data that is sent over the network 122. The virtualization module 144 receives a designation from the application 138 of a portion of the memory 130 of the first virtual machine (VM 1 (LPAR1) 124) as purgeable memory 152, wherein the purgeable memory 152 can be reconstructed by the application 138 when the purgeable memory 152 is unavailable. The virtualization module 144 tracks changes to a processor state and to a remaining portion (essential memory 154) of the memory 130 assigned to the application 138 that is not designated by the application 138 as purgeable memory 152. The virtualization module 144 periodically stops the first virtual machine (VM 1 (LPAR1) 124). In response to stopping the first virtual machine (VM 1 (LPAR1) 124), the virtualization module 144 forwards the changes to the remaining portion (essential memory 154) of the memory 130 to a secondary host machine 120 comprising a second virtual machine (VM 1' (LPAR1') 124'). In response to completing the forwarding of the changes, the virtualization module 144 resumes execution of the first virtual machine (VM 1 (LPAR1) 124). In response to an occurrence of a failure condition on the first virtual machine (VM 1 (LPAR1) 124), the virtualization module 144 signals the secondary host machine 120 to continue execution of the application 138 by using the forwarded changes to the remaining portion (essential memory 154) of the memory 130 and by reconstructing the purgeable memory 152.

In an exemplary aspect, an Application Program Interface (API) 156 resident in memory 130 provides memory protection to the essential memory 154 and the purgeable memory 152 by setting access codes 158, 160 respectively for essential memory 154 and purgeable memory 152 for conveying what is to be forwarded to the hypervisor 140.

Figure 2:
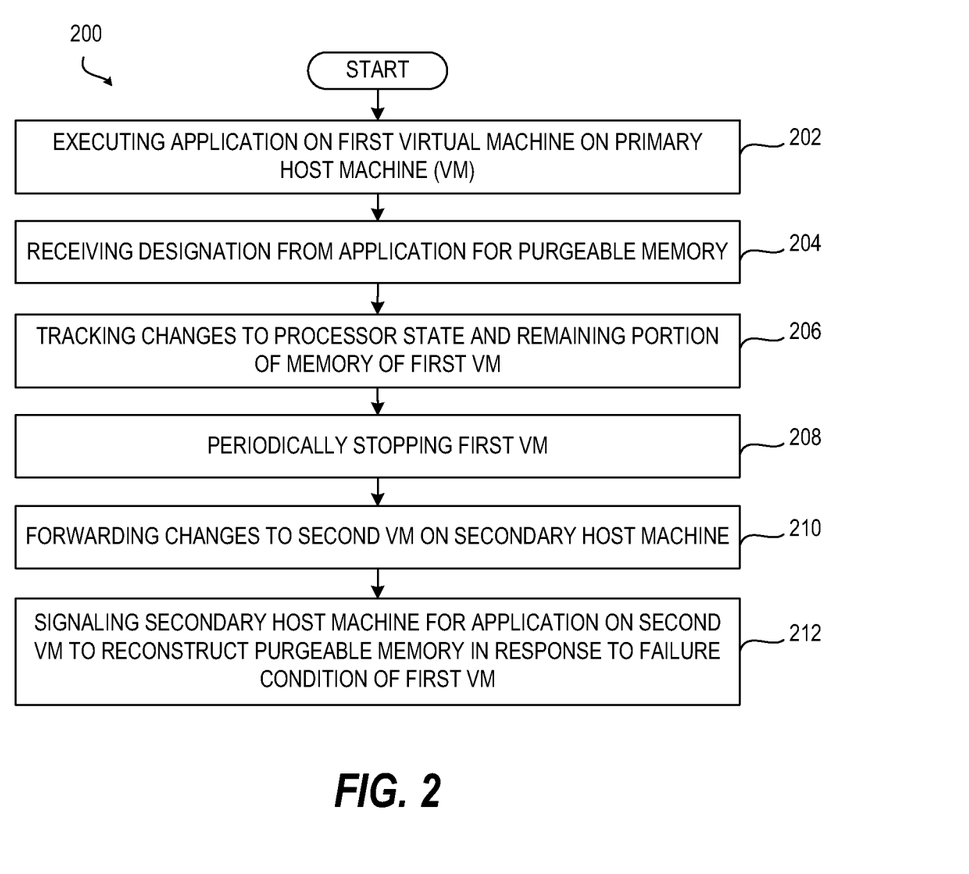
FIG. 2 provides a flow diagram illustrating a methodology for resource recovery within a mirrored virtualized DPS environment of FIG. 1, according to one more embodiments.

Referring now to FIG. 2, the present disclosure provides a computer-implemented method 200 for resource recovery for a high availability of an application executed in a virtualized environment while reducing data traffic on a network. A processor executes an application on a primary host machine comprising a first virtual machine with the processor and a memory (block 202). A designation is received from the application of a portion of the memory of the first virtual machine as purgeable memory (block 204). The purgeable memory can be reconstructed by the application when the purgeable memory is unavailable and thus is not essential. Changes to a processor state and to a remaining portion of the memory assigned to the application that is not designated by the application as purgeable memory are tracked (block 206). The first virtual machine is periodically stopped (block 208). In response to stopping the first virtual machine, the changes to the remaining portion of the memory are forwarded to a secondary host machine comprising a second virtual machine. In response to completing the forwarding of the changes, execution of the first virtual machine is resumed (block 210). In response to an occurrence of a failure condition on the first virtual machine, the secondary host machine is signaled to continue execution of the application by using the forwarded changes to the remaining portion of the memory and by reconstructing the purgeable memory (block 212).

Figure 3:
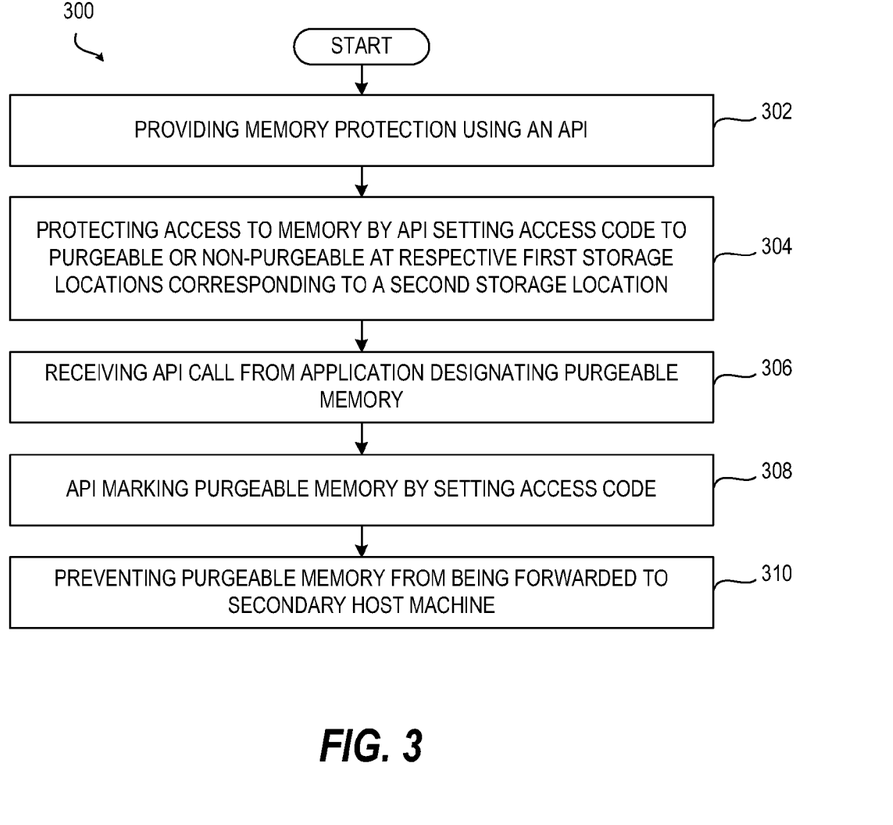
FIG. 3 provides a flow diagram illustrating a methodology for designating memory as purgeable or not purgeable within a mirrored virtualized data processing system (DPS), according to one or more embodiments.

In FIG. 3, the present disclosure provides an exemplary method 300 for designating memory as either purgeable or not purgeable. An application program interface (API) provides memory protection, preventing direct access to the memory (block 302). Access to the memory is protected by setting an access code to purgeable or non-purgeable respectively at a plurality of first storage locations that marks respectively a corresponding second storage location of the memory (block 304). The API receives the designation of the purgeable memory as an API call from the application (block 306). In response to receiving the designation, the API marks the purgeable memory by setting the access code to purgeable for a selected first storage location that corresponds to a selected second storage location comprising the purgeable memory (block 308). In response to the access code being set as purgeable, the API prevents the purgeable memory from being forwarded to the secondary host machine when the changes to the remaining portion of the memory are forwarded to the second virtual machine (block 310). In an exemplary embodiment, the API communicates the access codes for the memory to an underlying layer (e.g., Operating System (OS) or hypervisor) that performs the forwarding of changes to the second host machine to prevent forwarding purgeable memory.

Figure 4:
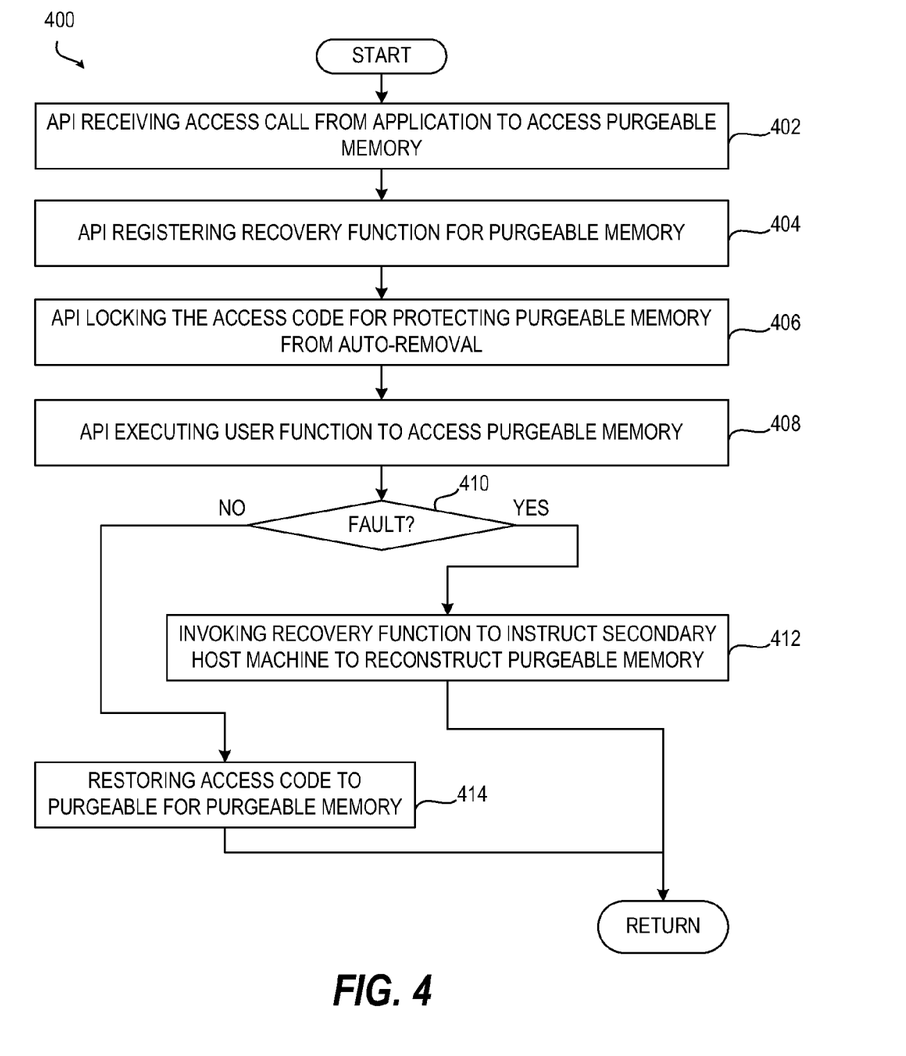
FIG. 4 provides a flow diagram illustrating a methodology for accessing memory designated as purgeable within a mirrored virtualized data processing system (DPS), according to one or more embodiments.

In FIG. 4, in a further exemplary aspect, a method 400 enables access by the application to the purgeable memory. The API receives an access call from the application to access the purgeable memory (block 402). In response to receiving the access call, the API registers a recovery function for the purgeable memory to provide a graceful recovery should a fault occur when attempting to access (block 404). The API changes the access code to locked for memory protection for the purgeable memory from an auto-removal policy (block 406). The API executes a user function (e.g., read, write) to access the purgeable memory specified by the access call (block 408). A determination is made as to whether a fault has occurred (block 410). For example, a fault can be determined that the purgeable memory is not present caused by attempting to access the purgeable memory. In response to a fault occuring, the API invokes the recovery function to instruct the secondary host machine to reconstruct the purgeable memory by the application on the secondary host machine (block 412). If however no fault occurred, then the API restores the access code to purgeable for memory protection (block 414).

It should be appreciated with the benefit of the present disclosure that there are several ways that an application could mark memory as purgeable. In one aspect, an API for purgeable memory can use a reference-counting approach, whereby the operating system is allowed to discard memory that is not in use by anyone, rather than paging the memory to disk. Memory that is marked as purgeable is not paged to disk when it is reclaimed by the virtual memory system because paging is a time-consuming process. Instead, the data is discarded, and if needed later, it will have to be recomputed.

In an illustrative aspect in FIGS. 5A-5D, a series of diagrams at subsequent points in time are depicted for using an API that marks purgeable memory and handles instances of the purgeable memory becoming inaccessible. With initial reference to FIG. 5A, a mark_purgeable( ) function marks regions of memory that will not be tracked as depicted 501. At a first time $t_1$, in block 502 a program (application) maps its memory 504 and sets up data structures 506, 508. At a second time $t_2$, in block 510 an API call by the program marks data structure 508 in memory 504 as purgeable, thus creating purgeable memory 508. Thus, the purgeable memory 508 is inaccessible to normal program code. The API call further propagates data to the operating system and an underlying hypervisor to prevent forwarding purgeable memory for resource recovery.

Figure 5A:
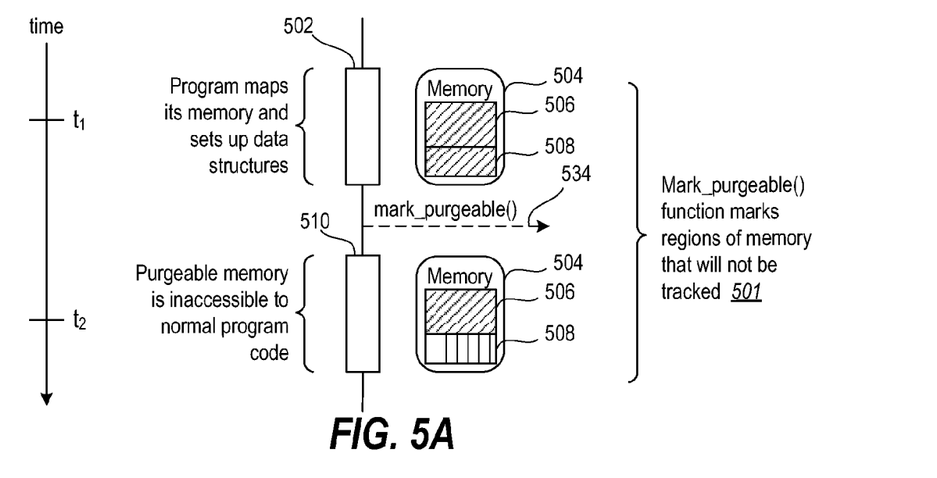
FIGS. 5A-5D provide a sequence of diagrams illustrating operation of an Application Programming Interface (API) for protecting, accessing, and recovering from failures associated with purgeable memory of an application or program executed on a virtual machine, according to one or more embodiments.
Figure 5B:
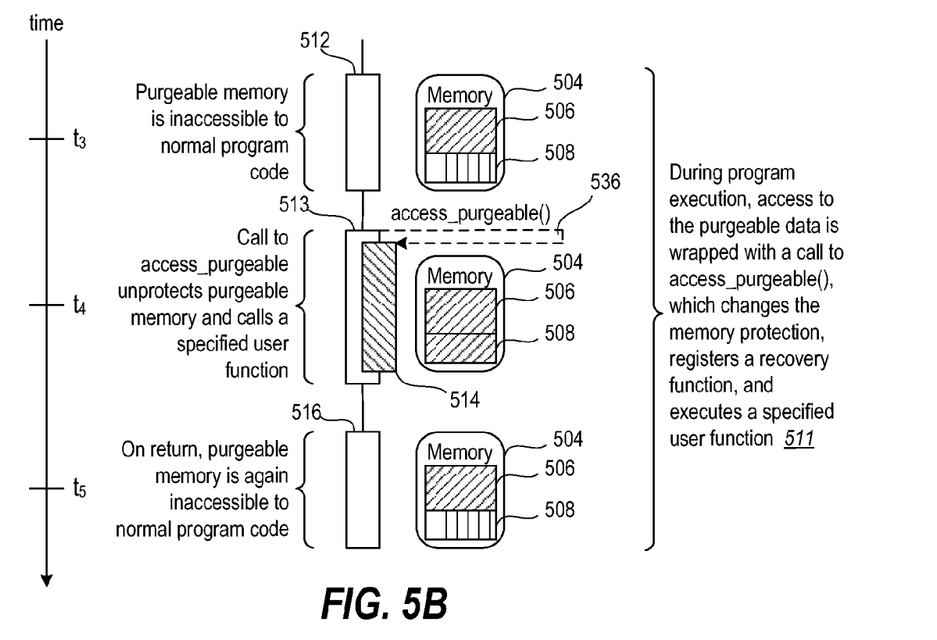

With reference to FIG. 5B, during program execution as depicted at 511, access to the purgeable data is wrapped with a call to access_purgeable( ) which changes the memory protection, registers a recovery function, and executes a specified user function. An initial state at a third time $t_3$, the purgeable memory is inaccessible to normal program code (block 512). Then at a fourth time $t_4$, the program makes an API call to access the purgeable memory. In block 513 in response the API unprotects the purgeable memory 508 and calls a specified user function 514. At a fifth time $t_5$, in block 516 upon return, the purgeable memory 508 is rendered inaccessible again to normal program code.

Figure 5C:
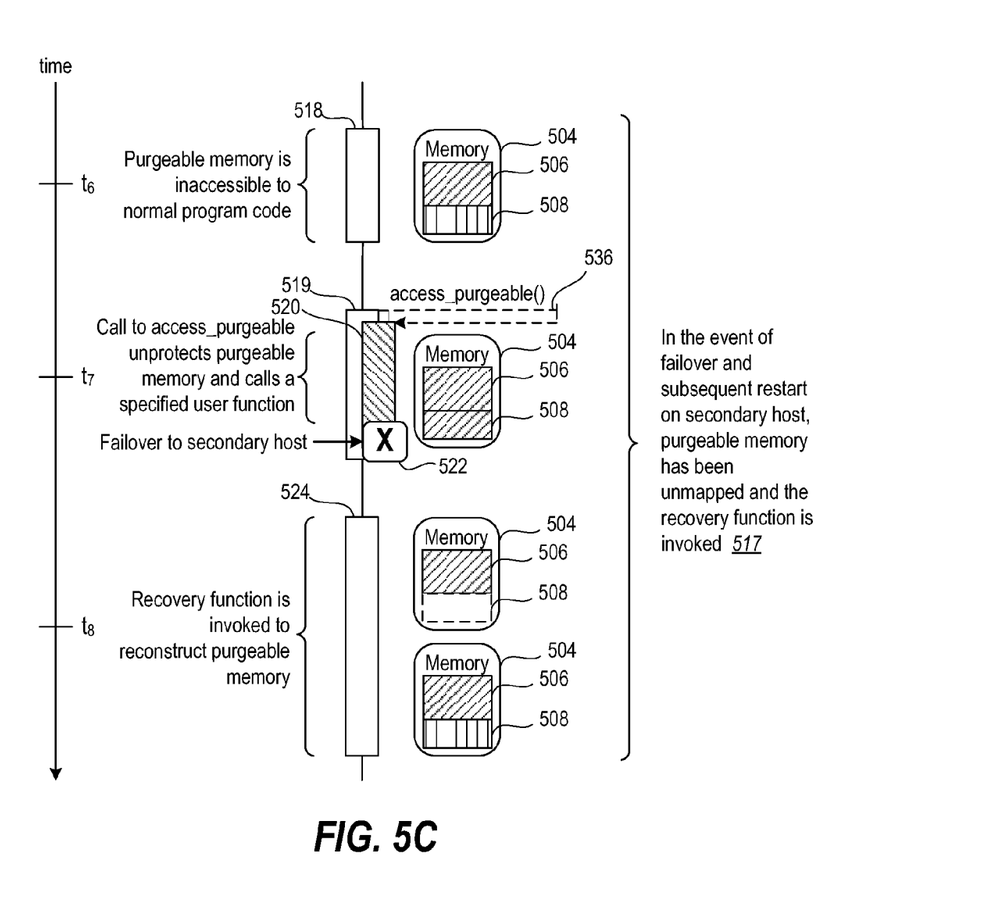

With reference to FIG. 5C, in the event of failover and subsequent restart on secondary host, purgeable memory has been unmapped and the recovery function is invoked as depicted at 517. An initial state at a sixth time $t_6$, the purgeable memory is inaccessible to normal program code (block 518). Then at a seventh time $t_7$, the program makes an API call to access the purgeable memory. In block 519, in response to the request to access the purgeable memory, the API unprotects the purgeable memory 508 and calls a specified user function 520. During access, a fault condition 522 occurs. At an eighth time $t_8$ in block 524, the recovery function is invoked so that the program can reconstruct the purgeable memory 508.

Figure 5D:
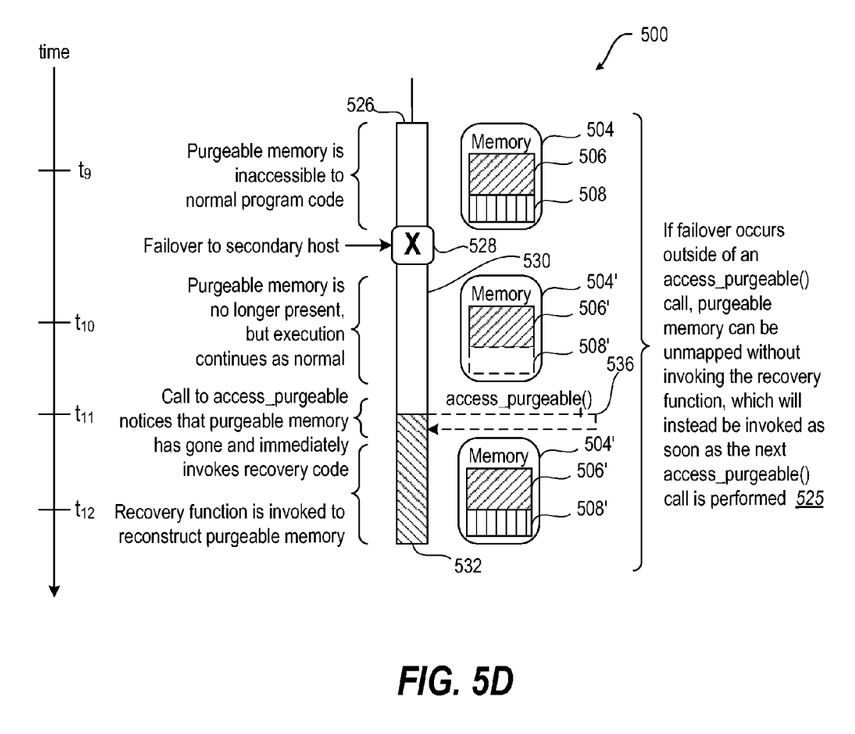

With reference to FIG. 5D, if the failover occurs outside of an access_purgeable( ) call, the purgeable memory can be unmapped without invoking the recovery function, which will instead be invoked as soon as the next access_purgeable call is performed as depicted at 525. At a ninth time $t_9$, in block 526, the purgeable memory 508 is rendered inaccessible to normal program code. Then a failover to a secondary host occurs as depicted at 528 at a tenth time $t_{10}$. As execution of the program on the secondary host machine commences in block 530, the memory 504' of the secondary host is initially in the state where the essential memory 506' has been received from the primary host machine but the purgeable memory 508' has not. At an eleventh time $t_{11}$ in block 532, the API receives an API call from the program to access the purgeable memory 508', which immediately results in detecting that the purgeable memory 508' is no longer available/present. At a twelfth time $t_{12}$ in block 532, the API immediately invokes the recovery function so that the program reconstructs the purgeable memory 508'.

It should be appreciated with the benefit of the present disclosure that a failure can cause immediate failover. For example, a failure condition can include sudden power loss on the primary host machine that provides no opportunity, or requirement, for any processing to occur between the failure case and resumption on the secondary host machine after failover. The secondary host machine resumes from the most recent checkpoint on the secondary system. When the program attempts to access purgeable memory, a fault occurs due to the memory not being mapped, and the recovery function is invoked. Thus, the fault in this instance occurs on the secondary host machine. In other words, in this example, the program is inside the block that accesses purgeable memory when the program fails over to the secondary. Secondary host machine resumes execution from the last checkpoint, which in this example is still inside the block that accesses purgable memory. When an instruction attempts to read or write memory to the purgeable region, the read/write operation will cause a memory fault interrupt to be delivered. On receipt of this interrupt, the recovery function is invoked to restore the memory, and the operation on the purgeable memory is retried.

In another example, the program is not executing inside a block that accesses purgeable memory when failover occurs. Secondary host machine resumes execution from the last checkpoint, which in this example is still outside the block that accesses purgeable memory. When the program next enters a block that accesses purgeable memory, the recovery function will be immediately invoked as the purgeable memory is not available on the secondary system.

In an exemplary aspect, an underlying technology can be used such as Virtual Page Class Keys on POWER systems to make that memory inaccessible to normal program code, which might not tolerate the sudden disappearance of the memory in the event of failure. The Virtual Page Class Key Protection mechanism provides one methodology and/or means to assign virtual pages to one of thirty-two (32) classes, and to modify access permissions for each class quickly by modifying the Authority Mask Register (AMR). The access permissions associated with the Virtual Page Class Key Protection mechanism apply only to data accesses, and only when address translation is enabled. An illustrative Access Mask Register (AMR) is provided in TABLES A-B:

TABLE A

| Key0 | Key1 | Key2 | ... | Key29 | Key30 | Key31 |
|------|------|------|-----|-------|-------|-------|
| 0    | 2    | 4    |     | 58    | 60    | 62    |

TABLE B

| Bits      | Name  | Description                    |
|-----------|-------|--------------------------------|
| 0:1       | Key0  | Access mask for class number 0 |
| 2:3       | Key1  | Access mask for class number 0 |
| ...       | ...   | ...                            |
| 2n:2n + 1 | Keyn  | Access mask for class number n |
| ...       | ...   | ...                            |
| 62:63     | Key31 | Access mask for class number 31|

The access mask for each class defines the access permissions that apply to loads and stores for which the virtual address is translated using a Page Table Entry that contains a KEY field value equal to the class number. The access permissions associated with each class are defined as follows, where $AMR_{2n}$ and $AMR_{2n+1}$ refer to the first and second bits of the access mask corresponding to class number n:
  (a) A store is permitted if $AMR_{2n}$=0b0; otherwise the store is not permitted.
  (b) A load is permitted if $AMR_{2n+1}$=0b0; otherwise the load is not permitted.

The AMR can be accessed using either Special Purpose Register (SPR) 13 or SPR 29. Access to the AMR using SPR 29 is privileged.

Third, an API call allows a user-specified function to access purgeable code. To do this, the API call must also specify a function to invoke if the purgeable memory vanishes due to failover. The API would modify the AMR register on the way in to and out of the specified function, so that purgeable memory could be accessed as normal within the user-specified function. This API call would be used, for example, to wrap calls to "add an item to a cache" and "lookup an item in the cache". Any removal of the purgeable memory while the operation was in progress would call a handler function that would reinitialize the required data structures and then re-perform the operation.

It should be appreciated with the benefit of the present disclosure that use of Class Keys for page protection is not necessary, but illustrates one way of guaranteeing that no access to the purgeable memory is possible outside of the specially guarded code. In one aspect, this feature can be used during application set up (or initialization) time and switched off in production code in order mitigate certain performance impacts.

Thus, returning to FIGS. 5A-5D, a mark_purgeable( ) function, depicted at 534, can be used to mark specific regions of memory that will not be tracked. During program execution, access to the purgeable data is wrapped with a call to access_purgeable( ) depicted at 536, which changes the memory protection, registers a recovery function and executes a specified user function.

In the event of a failover and subsequent restart on the secondary host, the purgeable memory has been unmapped and the recovery function is invoked. If the failover occurs outside an access_purgeable( ) call, the purgeable memory can be unmapped without invoking the recovery function, which will instead be invoked as soon as the next access_purgeable( ) call is performed.

The innovations herein describe the process as the process would apply to application-accessible memory. However, the same technique could be used within an operating system, to mark up regions of memory such as file caches and network buffers that could be flushed and refilled in the event of failover.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the innovation. Thus, while the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

As will be appreciated by one skilled in the art, aspects of the present innovation may be embodied as a system, method or computer program product. Accordingly, aspects of the present innovation may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present innovation may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present innovation may be written in any combination of one or more programming languages, including an object oriented programming language such as Java, Smalltalk, C++ or the like and conventional procedural programming languages, such as the "C" programming language or assembly level programming or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present innovation are described below with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present innovation may be implemented using any combination of software, firmware or hardware. As a preparatory step to practicing the innovation in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the innovation. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the innovation may be practiced by combining one or more machine-readable storage devices containing the code according to the present innovation with appropriate processing hardware to execute the code contained therein. An apparatus for practicing the innovation could be one or more processing devices and storage systems containing or having network access to program(s) coded in accordance with the innovation.

Thus, it is important that while an illustrative embodiment of the present innovation is described in the context of a fully functional computer (server) system with installed (or executed) software, those skilled in the art will appreciate that the software aspects of an illustrative embodiment of the present innovation are capable of being distributed as a program product in a variety of forms, and that an illustrative embodiment of the present innovation applies equally regardless of the particular type of media used to actually carry out the distribution.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A computer program product for resource recovery, comprising:

a non-transitory computer readable storage device; and
program code on the non-transitory computer readable storage device that when executed by a processor within a primary host machine comprising a first virtual machine with the processor, a memory, and an application executing on the processor that accesses the memory, the program code performs a series of functions comprising:
  receiving, from the application, a memory mapping of the application within the memory that comprises a plurality of regions including at least one first region and at least one second region;
  marking, via a mark purgeable function, the at least one second region as a purgeable memory that will not be tracked, wherein the purgeable memory can be reconstructed by the application at a second virtual machine of a secondary host machine when the purgeable memory is unavailable;
  in response to marking the purgeable memory, tracking the at least one first region within the memory mapping for changes;
  in response to stopping execution of the first virtual machine:
    forwarding only the changes to the at least one first region to the second virtual machine, wherein any changes to the purgeable memory are not forwarded to the secondary host machine; and
    in response to completing the forwarding of the changes, resuming execution of the first virtual machine; and
  in response to an occurrence of a failure condition on the first virtual machine:
    reconstructing the purgeable memory by the application at the second virtual machine; and
    signaling the secondary host machine to continue execution of the application using the forwarded changes to the at least one first region.

2. The computer program product of claim 1, further comprising program code for:
  tracking changes to a processor state of the processor;
  periodically stopping execution of the first virtual machine;
  protecting access to the memory by setting an access code at each of a plurality of first storage locations of the memory that correspond to a second storage location to one of purgeable or non-purgeable;
  receiving the marking of the purgeable memory as an application program interface (API) call;
  in response to receiving the marking, setting the access code of the purgeable memory to purgeable for a selected first storage location that corresponds to a selected second storage location that comprises the purgeable memory; and
  in response to the access code being set as purgeable, preventing the purgeable memory from being forwarded to the secondary host machine when the changes to the at least one first region are forwarded to the second virtual machine.

3. The computer program product of claim 2, further comprising program code for enabling access by the application to the purgeable memory by:
  receiving an access call from the application to access the purgeable memory;
  changing, via an auto-removal policy, the access code for the purgeable memory to locked, wherein changing the access code for the purgeable memory to locked prevents the purgeable memory from being disposed of while being accessed;
  executing a user function to access the purgeable memory specified by the access call; and
  restoring the access code for the purgeable memory to purgeable.

4. The computer program product of claim 3, further comprising program code for providing a memory protection API that enables access to the memory and prevents direct access to the purgeable memory.

5. The computer program product of claim 3, further comprising program code for:
  in response to receiving the access call, registering a recovery function for the purgeable memory; and
  in response to a fault that the purgeable memory is not present caused by attempting to access the purgeable memory, invoking the recovery function to instruct the secondary host machine to reconstruct the purgeable memory by the application on the secondary host machine.

6. The computer program product of claim 1, further comprising program code for, in response to the occurrence of the failure condition, an operating system of the primary host machine signaling the secondary host machine to:
  continue execution of the application using the forwarded changes to the at least one first region; and
  instruct the application, while the purgeable memory is unavailable, to perform a reconstructing of the purgeable memory at the secondary host machine.

7. The computer program product of claim 1, further comprising program code for, in response to the occurrence of the failure condition, a hypervisor of the primary host machine signaling the secondary host machine to:
  continue execution of the application using the forwarded changes to the at least one first region; and
  instruct the application, while the purgeable memory is unavailable, to perform a reconstructing of the purgeable memory at the secondary host machine.

8. A data processing system, comprising:
  a processor that executes an application on a primary host machine comprising a first virtual machine with the processor and a memory; and
  a virtualization module that executes on the processor to:
    receive, from the application, a memory mapping of the application within the memory that comprises a plurality of regions including at least one first region and at least one second region;
    mark, via a mark purgeable function, the at least one second region as a purgeable memory that will not be tracked, wherein the purgeable memory can be reconstructed by the application at a second virtual machine of a secondary host machine when the purgeable memory is unavailable;
    in response to marking the purgeable memory, track the at least one first region within the memory mapping for changes;
    in response to stopping execution of the first virtual machine:
      forward only the changes to the at least one first region to the second virtual machine, wherein any changes to the purgeable memory are not forwarded to the secondary host machine; and
      in response to completing the forwarding of the changes, resume execution of the first virtual machine; and in response to an occurrence of a failure condition on the first virtual machine:
  reconstruct the purgeable memory by the application at the second virtual machine; and
  signal the secondary host machine to continue execution of the application using the forwarded changes to the at least one first region.

9. The data processing system of claim 8, wherein the virtualization module further causes the data processing system to:
  track changes to a processor state of the processor;
  periodically stop execution of the first virtual machine;
  protect access to the memory by setting an access code at each of a plurality of first storage locations of the memory that correspond to a second storage location to one of purgeable or non-purgeable;
  receive the marking of the purgeable memory as an application program interface (API) call;
  in response to receiving the marking, set the access code of the purgeable memory to purgeable for a selected first storage location that corresponds to a selected second storage location that comprises the purgeable memory; and
  in response to the access code being set as purgeable, prevent the purgeable memory from being forwarded to the secondary host machine when the changes to the at least one first region are forwarded to the second virtual machine.

10. The data processing system of claim 9, wherein the virtualization module further causes the data processing system to enable access by the application to the purgeable memory by causing the data processing system to:
  receive an access call from the application to access the purgeable memory;
  change, via an auto-removal policy, the access code for the purgeable memory to locked, wherein changing the access code for the purgeable memory to locked prevents the purgeable memory from being disposed of while being accessed;
  execute a user function to access the purgeable memory specified by the access call; and
  restore the access code for the purgeable memory to purgeable.

11. The data processing system of claim 10, wherein:
  the virtualization module further comprises a memory protection API that enables access to the memory and prevents direct access to the purgeable memory; and
  the virtualization module further causes the data processing system to:
    in response to receiving the access call, register a recovery function for the purgeable memory; and
    in response to a fault that the purgeable memory is not present caused by attempting to access the purgeable memory, invoke the recovery function to instruct the secondary host machine to reconstruct the purgeable memory by the application on the secondary host machine.

12. The data processing system of claim 8 wherein:
  the virtualization module further causes the data processing system to, in response to the occurrence of the failure condition, signal, via a hypervisor of the primary host machine, the secondary host machine to:
    continue execution of the application using the forwarded changes to the at least one first region; and
    instruct the application, while the purgeable memory is unavailable, to reconstruct the purgeable memory at the secondary host machine; and
  the purgeable memory further comprises at least one of: one or more caches of the application and one or more disposable components of the application that can be reconstructed by the application.

13. The computer program product of claim 6, further comprising program code for:
  using a reference-counting function that enables the operating system to discard memory that is not in use;
  wherein the purgeable memory is not paged to disk during a reclaiming operation.

14. The computer program product of claim 5, further comprising program code for:
  in response to signaling the secondary host machine to continue execution of the application using the forwarded changes to the at least one first region:
    in response to an occurrence of a failure condition on the second virtual machine outside of an access purgeable call, unmapping the purgeable memory without invoking the recovery function;
    detecting a memory fault interrupt on the secondary host machine caused by an operation on the purgeable memory; and
    in response to detecting the memory fault interrupt on the secondary host machine:
      immediately invoking the recovery function to instruct the secondary host machine to reconstruct the purgeable memory by the application on the secondary host machine; and
      retrying the operation on the purgeable memory;
  wherein the purgeable memory further comprises at least one of: one or more caches of the application and one or more disposable components of the application that can be reconstructed by the application.

15. The data processing system of claim 12, wherein the virtualization module further causes the data processing system to:
  use a reference-counting function that enables the operating system to discard memory that is not in use;
  wherein the purgeable memory is not paged to disk during a reclaiming operation.

16. The data processing system of claim 11, wherein the virtualization module further causes the data processing system to:
  in response to signaling the secondary host machine to continue execution of the application using the forwarded changes to the at least one first region:
    in response to an occurrence of a failure condition on the second virtual machine outside of an access purgeable call, unmap the purgeable memory without invoking the recovery function;
    detect a memory fault interrupt on the secondary host machine caused by an operation on the purgeable memory; and
    in response to detecting the memory fault interrupt on the secondary host machine:
      immediately invoke the recovery function to instruct the secondary host machine to reconstruct the purgeable memory by the application on the secondary host machine; and
      retry the operation on the purgeable memory.

17. The computer program product of claim 13, wherein the program code for marking the at least one second region as the purgeable memory further comprises program code for:
  using the reference-counting function, determining, for the at least one second region, whether the at least one second region is in use by anyone; and in response to determining, via the reference-counting function, that the at least one second region is not in use by anyone:

marking the at least one second region as the purgeable memory to prevent the purgeable memory from being paged to a disk when the purgeable memory is being reclaimed; and     discarding the purgeable memory.

18. The computer program product of claim 1, the program code further comprising program code for:

receiving an identification of a user-specified function to access purgeable code within the purgeable memory;

specifying, within a particular application program interface (API) call, a particular function to be invoked in the event the purgeable memory vanishes due to the failure condition on the first virtual machine, wherein the particular API call modifies an Authority Mask Register (AMR) in-to and out-of the user-specified function to enable the purgeable memory to be accessed normally within the user-specified function, wherein access to the AMR is privileged, and wherein the AMR is accessed using a Special Purpose Register (SPR); and in response to any removal of the purgeable memory while an operation is in progress on the purgeable memory:

calling a handler function to reinitialize the purgeable memory; and     re-performing the operation.

19. The data processing system of claim 15, wherein marking the at least one second region as the purgeable memory further comprises the virtualization module executing on the processor to:

use the reference-counting function, determining, for the at least one second region, whether the at least one second region is in use by anyone; and in response to determining, via the reference-counting function, that the at least one second region is not in use by anyone:

mark the at least one second region as the purgeable memory to prevent the purgeable memory from being paged to a disk when the purgeable memory is being reclaimed; and     discard the purgeable memory.

20. The data processing system of claim 8, wherein the virtualization module further causes the data processing system to:

receive an identification of a user-specified function to access purgeable code within the purgeable memory;

specify, within a particular application program interface (API) call, a particular function to be invoked in the event the purgeable memory vanishes due to the failure condition on the first virtual machine, wherein the particular API call modifies an Authority Mask Register (AMR) in-toand out-of the user-specified function to enable the purgeable memory to be accessed normally within the user-specified function, wherein access to the AMR is privileged, and wherein the AMR is accessed using a Special Purpose Register (SPR); and in response to any removal of the purgeable memory while an operation is in progress on the purgeable memory:

call a handler function to reinitialize the purgeable memory; and     re-perform the operation.

\* \* \* \* \*